(12) United States Patent
Long

(10) Patent No.: US 7,382,280 B2
(45) Date of Patent: Jun. 3, 2008

(54) PARKING VIOLATION RECORDING SYSTEM AND METHOD

(75) Inventor: William E. Long, Sea Cliff, NY (US)

(73) Assignee: CleverDevices, Inc., Plainview, NY (US)

( * ) Notice: Subject to any disclaimer, the term of this patent is extended or adjusted under 35 U.S.C. 154(b) by 153 days.

(21) Appl. No.: 11/251,984

(22) Filed: Oct. 17, 2005

(65) Prior Publication Data

US 2007/0085704 A1 Apr. 19, 2007

(51) Int. Cl.
G08G 1/017 (2006.01)
B60Q 1/48 (2006.01)
G07B 15/02 (2006.01)
G06K 9/00 (2006.01)

(52) U.S. Cl. ............... 340/937; 340/932.2; 340/425.5; 705/13; 705/418; 348/105; 235/384; 382/105

(58) Field of Classification Search .................. 340/937
See application file for complete search history.

(56) References Cited

U.S. PATENT DOCUMENTS

| | | | |
|---|---|---|---|
| 4,817,166 | A | 3/1989 | Gonzalez et al. |
| 5,081,685 | A | 1/1992 | Jones et al. |
| 5,343,237 | A | 8/1994 | Morimoto |
| 5,510,764 | A | 4/1996 | Hauptli |
| 5,948,038 | A | 9/1999 | Daly et al. |
| 6,026,177 | A | 2/2000 | Mong et al. |
| 6,081,206 | A | 6/2000 | Kielland |
| 6,188,329 | B1 | 2/2001 | Glier et al. |
| 6,199,014 | B1 | 3/2001 | Walker et al. |
| 6,243,029 | B1 | 6/2001 | Tomer |

(Continued)

FOREIGN PATENT DOCUMENTS

FR 2802004 6/2001

(Continued)

OTHER PUBLICATIONS

CTA Press Releases, "Talking Buses Making Bus Rides Easier for CTA Customers", Chicago Transit Authority (2002).

(Continued)

*Primary Examiner*—Donnie L Crosland
(74) *Attorney, Agent, or Firm*—Hoffmann & Baron, LLP

(57) ABSTRACT

A parking violation recording system capable of recording violations based on the location of a violating vehicle, is provided. The system includes at least one camera located on a mass transit vehicle, oriented so that it is capable of viewing a violating vehicle and recording an image containing violating vehicle information of the violating vehicle; at least one locator provided on said mass transit vehicle and capable of providing data for determining the geographic position of the mass transit vehicle; and a data processing sub-system, coupled to the at least on camera and the at least one locator for recording both the violating vehicle information and the geographic data in a violation data record. In another aspect, the invention is directed to a method of enforcing bus zone regulations. The method includes recording an image containing violating vehicle information of a violating vehicle illegally parked in a bus zone with at least one camera located on a mass transit bus, and storing the violating vehicle information in a data record associated with a data processing system located on the bus.

37 Claims, 4 Drawing Sheets

U.S. PATENT DOCUMENTS

| | | |
|---|---|---|
| 6,289,453 B1 | 9/2001 | Walker et al. |
| 6,344,806 B1 | 2/2002 | Katz |
| 6,373,402 B1 | 4/2002 | Mee |
| 6,411,874 B2 | 6/2002 | Morgan et al. |
| 6,459,386 B1 | 10/2002 | Jones |
| 6,473,517 B1 | 10/2002 | Tyan et al. |
| 6,553,131 B1 | 4/2003 | Neubauer et al. |
| 6,559,776 B2 | 5/2003 | Katz |
| 6,560,535 B2 | 5/2003 | Levy et al. |
| 6,587,586 B1 | 7/2003 | Cui et al. |
| 6,606,554 B2 | 8/2003 | Edge |
| 6,678,413 B1 | 1/2004 | Liang et al. |
| 6,680,694 B1 | 1/2004 | Knockeart et al. |
| 6,690,294 B1 | 2/2004 | Zierden |
| 6,735,506 B2 | 5/2004 | Breed et al. |
| 6,754,369 B1 | 6/2004 | Sazawa |
| 6,754,663 B1 | 6/2004 | Small et al. |
| 6,784,832 B2 | 8/2004 | Knockeart et al. |
| RE38,626 E | 10/2004 | Kielland |
| 6,847,892 B2 | 1/2005 | Zhou et al. |
| 2002/0080013 A1 | 6/2002 | Anderson et al. |
| 2004/0094621 A1 | 5/2004 | LaMont |
| 2004/0174253 A1 | 9/2004 | Chen |
| 2005/0043885 A1 | 2/2005 | Amlinger |
| 2005/0111699 A1* | 5/2005 | Gran ............................ 382/104 |

FOREIGN PATENT DOCUMENTS

| | | |
|---|---|---|
| GB | 2284290 A | 5/1995 |

OTHER PUBLICATIONS

Technology Services, CleverDevices, Syosset, New York (2002).
Maintenance & Performance Monitoring, CleverDevices, Syosset, New York (2002).
Safety & Security, CleverDevices, Syosset, New York (2002).
Automatic Passenger Counter, CleverDevices, Syosset, New York (Oct. 2005).
BusLink™ Data Distribution Network, CleverDevices, Syosset, New York (Oct. 2005).
Fleet Data Bank™ Data Repository, CleverDevices, Syosset, New York (Oct. 2005).
Intelligent Vehicle Network® System Architecture, CleverDevices, Syosset, New York (Oct. 2005).
Bus Tools™ Data Management System, CleverDevices, Syosset, New York (Oct. 2005).
SpeakEasy2 Hands-Free Digital Microphone, CleverDevices, Syosset, New York (Oct. 2005).
Automatic Vehicle Monitoring, CleverDevices, Syosset, New York (Oct. 2005).

* cited by examiner

PARKING VIOLATION RECORDING SYSTEM AND METHOD

BACKGROUND OF THE INVENTION

The invention relates to enforcement of parking regulations and more particularly to a system and method for recording parking violations for vehicles illegally parked in restricted parking areas, in order to generate parking violation citations. In a specific embodiment, the system and method is directed to recording parking violations for vehicles parked in the no parking zone of a bus stop.

Municipal governments enact regulations to govern the parking of cars and other vehicles along city streets. These regulations include no parking, no stopping and no standing zones to ensure access to certain areas along the side of the road for a variety of reasons. These zones are typically located in front of fire hydrants, handicap ramps and bus stops. Vehicles illegally parked in front of fire hydrants pose a safety hazard by causing delays in gaining access to the hydrant when it is needed. Blocked handicap ramps pose the obvious safety hazard for people with disabilities that have to traverse the curb or steps in place of the blocked ramp. In addition to causing delays on municipal bus routes, vehicles illegally parked in a bus zone also pose a safety hazard for passengers trying to load on and unload off the bus because the bus cannot stop at the appropriate location at the bus stop.

This especially impacts elderly people, or people with disabilities or injuries, that rely on public transportation. A municipal bus is typically capable of pulling up to a bus stop and "kneeling" at the curb to allow passengers easy access to the bus through the front door or the side handicap door. If an illegally parked vehicle prevents this from happening, the bus will have to stop some distance away from the curb or designated bus stop location and passengers will have to make their way to the bus. This may require people with disabilities, or other difficulties walking, to have to traverse the curb and enter the bus at a height. This process becomes even more hazardous when ice and snow are present.

Municipalities have recognized that vehicles blocking bus zones are becoming an increasing problem, especially in large cities, because of the resulting delays in the mass transit system and the safety concerns. In order to combat this problem, municipalities have increased enforcement efforts by hiring more transit and police officers to issue more citations and have increased fines for such offenses. Some municipalities have even elevated bus zone blocking to a moving rather than a parking violation. However, adding more transit and police officers requires the municipality to incur significant additional expense and has had only limited success in reducing the problem of bus zone blocking due to the large number of bus stops that need to be patrolled.

Therefore, there is a need for systems and methods to more efficiently enforce no parking zones, e.g., bus zones, and to significantly deter future illegal parking in such zones.

SUMMARY OF THE INVENTION

According to the present invention, a parking violation recording system capable of recording violations based on the location of a violating vehicle, is provided. The system includes at least one camera located on a mass transit vehicle, oriented so that it is capable of viewing a violating vehicle and recording an image containing violating vehicle information of the violating vehicle; at least one locator provided on said mass transit vehicle and capable of providing data for determining the geographic position of the mass transit vehicle; and a data processing sub-system, coupled to the at least on camera and the at least one locator for recording both the violating vehicle information and the geographic data in a violation data record.

In a preferred embodiment, the mass transit vehicle is a bus and the violating vehicle is a vehicle illegally located in a bus zone. The image can be a digital image capable of being stored electronically. In one embodiment, violating vehicle information is a digital image of the violating vehicle's license plate.

The locator is preferably selected from the group consisting of a GPS capable of providing global position data, at least one navigation aid capable of providing relative position data of the mass transit vehicle and combinations thereof. The relative position data preferably includes at least one of distance measurements, heading measurements and tilt measurements. The navigation aid includes at least one of anti-lock braking system wheel turns data, electronic compass heading and pitch, and map vertical height.

In one embodiment, the locator comprises a GPS and at least one navigation aid which provides relative position data selected from the group consisting of distance measurements, heading measurements, tilt measurements and combinations thereof. In such an embodiment, the data processing sub-system is preferably capable of integrating the GPS position data and the relative position data and determining a smoothed position data for the mass transit vehicle. Preferably, the data processing sub-system is capable of compensating for degradation, blockages or communication dropouts of the GPS position data from satellites in determining the smoothed position data. In an embodiment where the mass transit vehicle is a bus, the data processing system is also capable of comparing the position data, i.e., GPS and/or relative position data, to bus stop geographic coding data and making corrections to the position data for the bus.

The data processing sub-system is preferably capable of determining smoothed position data that is accurate to within at least about 70 feet, more preferably to within at least about 50 feet and, most preferably, to within at least about 30 feet.

In one embodiment, the data processing sub-system also includes a memory containing stored map data and mass transit vehicle data. The stored map data can be selected from the group consisting of a predetermined route, transit stop inventory, a route identifier associated with a predetermined route, a transit stop identifier associated with a particular transit stop along a route and combinations thereof. The mass transit vehicle data can be selected from the group consisting of a vehicle identifier, an operator identifier, a run identifier and combinations thereof.

The parking violation recording system also preferably includes a date and time clock, wherein the data processing sub-system is coupled to the clock for recording date and time information in the violation data record. Preferably, the data processing sub-system is capable of determining the route identifier and the transit stop identifier from the geographic data and map data, and recording these identifiers in the violation data record. The violation record can also include the vehicle, operator and run identifiers.

In another embodiment, the data processing sub-system is capable of extracting the license plate number from the image, so that the violating vehicle information is the license plate number of the violating vehicle. The data processing sub-system can use a pattern matching license plate algorithm to extract the license plate number from the image. The data processing sub-system can also use a full recognition mode license plate recognition algorithm to extract the license plate number from the image. It is also contemplated that the data processing sub-system can use both a pattern matching license plate algorithm and a full recognition mode license plate recognition algorithm to extract the license plate number from the image.

Preferably, the data processing sub-system is capable of determining the issuing state of the license plate of the violating vehicle from the image, so that the violating vehicle information includes both the license plate number and the state from which it was issued. In one embodiment, the issuing state is determined from the state logo or symbol contained on the license plate.

The parking violation recording system can also include an operator interface for an operator to selectively create the violation data record. The interface can be selected from the group consisting of a manual switch, a computer interface and a voice controlled switch. The parking violation recording system can also include a display for displaying an image containing violating vehicle information of the violating vehicle to assist the operator in determining whether or not to selectively create the violation data record.

In one embodiment, it is contemplated that the parking violation recording system includes a sensor located on the mass transit vehicle and coupled to the data processing sub-system, wherein the sensor measures the distance between a potentially violating vehicle and the sensor. In such an embodiment, the data processing sub-system is preferably capable of determining if the potentially violating vehicle is a violating vehicle and automatically creating a violation data record, in the event the vehicle is a violating vehicle.

Preferably, the parking violation recording system also includes a database coupled to the data processing sub-system for storing a plurality of violation data records. The parking violation recording system also preferably includes a download interface for downloading the plurality of violation data records to a citation database contained in a remote data processing system, the remote data processing system being remote from the mass transit vehicle, for further processing by law enforcement to generate a citation for the violation.

The download interface can operate through a hardwire connection between the data processing sub-system and the remote data processing system. The download interface can also operate through wireless communication between the data processing sub-system and the remote data processing system.

In a specific aspect, the invention is directed to a bus zone violation recording system capable of recording violations of a violating vehicle located in a bus zone. The system includes at least one camera located on a mass transit bus, oriented so that it is capable of viewing a violating vehicle located in a bus zone and recording an image containing violating vehicle information of the violating vehicle; at least one locator provided on the bus and capable of providing data for determining the geographic position of the bus; a date and time clock; and a data processing sub-system, coupled to the camera, locator and clock for recording the violating vehicle information, geographic data, and date and time information in a violation data record.

The at least one locator is selected from the group consisting of a GPS capable of providing global position data, at least one navigation aid capable of providing relative position data of said bus and combinations thereof. The data processing sub-system includes a memory containing stored map data and bus data. The map data can include data selected from the group consisting of a route identifier associated with a predetermined route, a bus stop identifier associated with particular bus stop along a route, a bus zone identifier associated with a particular bus zone at a bus stop and combinations thereof. The data processing sub-system is capable of determining the bus stop identifier or bus zone identifier from the geographic and map data and recording those identifiers in the violation data record. The bus data can include data selected from the group consisting of an operator identifier, bus identifier, run identifier and combinations thereof. The data processing sub-system can record this bus data in the violation data record.

The bus zone violation recording system also preferably includes an operator interface for an operator to selectively create the violation data record. In one embodiment, the violation data record includes a digital image containing violating vehicle information of the violating vehicle, geographic information identifying the location of said violating vehicle, bus information and date and time information. In another embodiment, the violation data record includes a license plate number of the violating vehicle, geographic information identifying the location of the violating vehicle, bus information and date and time information.

In one embodiment, the bus zone violation recording system includes at least two cameras located on a mass transit bus, wherein a first camera is oriented so that it is capable of viewing and recording license plate information from a violating vehicle and a second camera is oriented to capture an image of the entire or substantially the entire violating vehicle. Preferably, the second camera is capable of recording a side view image of the vehicle. Preferably, the second camera is capable of recording a color image. It is also contemplated that the system can include a camera capable of capturing an image that shows the violating vehicle and its relative position to the bus stop, bus zone or some other landmark.

In yet another aspect, the invention is directed to a method of enforcing bus zone regulations. The method includes recording an image containing violating vehicle information of a violating vehicle illegally parked in a bus zone with at least one camera located on a mass transit bus, and storing the violating vehicle information in a data record associated with a data processing system located on the bus. The method also preferably includes generating a citation from the data record and issuing the citation to the owner of the violating vehicle.

DETAILED DESCRIPTION OF THE INVENTION

Figure 1A:
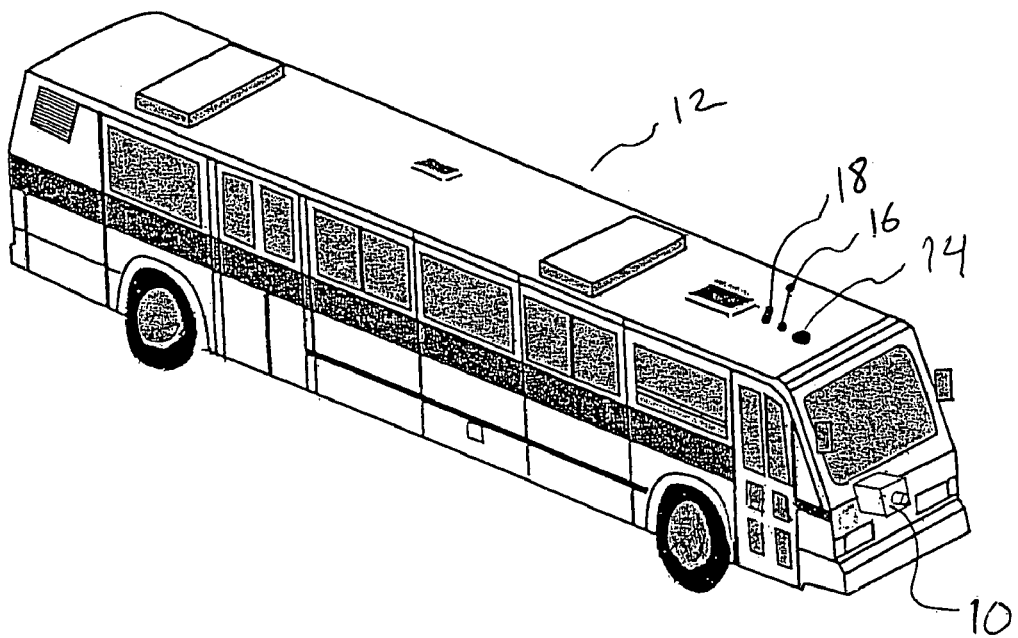
FIG. 1A is a prospective view of a mass transit bus equipped with a parking violation recording system, according to a preferred embodiment of the present invention.

The present invention provides a parking violation recording system capable of recording violations based on the location of a violating vehicle. The system includes at least one camera located on a mass transit vehicle, oriented so that it is capable of viewing a violating vehicle and recording an image containing violating vehicle information of the violating vehicle. The image can be a digital image capable of being stored electronically. In one embodiment, violating vehicle information is a digital image of the violating vehicle's license plate. The system can also include an illuminator on the mass transit vehicle positioned to enhance the quality of the image and, more specifically, the violating vehicle information to be captured in the image.

The system also includes at least one locator provided on the mass transit vehicle and capable of providing data for determining the geographic position of the mass transit vehicle and includes a data processing sub-system, coupled to the camera and the locator for recording both the violating vehicle information and the geographic data in a violation data record.

The locator is preferably selected from the group consisting of a GPS capable of providing global position data, at least one navigation aid capable of providing relative position data of the mass transit vehicle and combinations thereof. The relative position data preferably includes at least one of distance measurements, heading measurements and tilt measurements. The navigation aid can include at least one of anti-lock braking system wheel turns data, electronic compass heading and pitch, and map vertical height.

In one embodiment, the locator includes a GPS and at least one navigation aid which provides relative position data selected from the group consisting of distance measurements, heading measurements, tilt measurements and combinations thereof. In such an embodiment, the data processing sub-system is preferably capable of integrating the GPS position data and the relative position data and determining a smoothed position data for the mass transit vehicle. Preferably, the data processing sub-system is capable of compensating for degradation, blockages or communication dropouts of the GPS position data from satellites in determining the smoothed position data.

The data processing sub-system is preferably capable of determining smoothed position data that is accurate to within at least about 70 feet, more preferably to within at least about 50 feet and, most preferably, to within at least about 30 feet.

In one embodiment, the data processing sub-system also includes a memory containing stored map data and mass transit vehicle data. The stored map data can be selected from the group consisting of a predetermined route, transit stop inventory, a route identifier associated with a predetermined route, a transit stop identifier associated with a particular transit stop along a route and combinations of thereof. The mass transit vehicle data can be selected from the group consisting of a vehicle identifier, an operator identifier, a run identifier and combinations thereof. The data processing sub-system can also be capable of comparing the position data, i.e., GPS and/or relative position data, to known fixed locations and making corrections to the position data. For example, a mass transit bus can compare the position data to bus stop geographic coding data and make corrections to the position data when the bus stops at a bus stop having a known position.

The parking violation recording system also preferably includes a date and time clock, wherein the data processing sub-system is coupled to the clock for recording date and time information in the violation data record. Preferably, the data processing sub-system is capable of determining the route identifier and the transit stop identifier from the geographic data and map data, and recording these identifiers in the violation data record. The violation data record can also include the vehicle, operator and run identifiers.

In another embodiment, the data processing sub-system is capable of extracting the license plate number from the image, so that the violating vehicle information is the license plate number of the violating vehicle.

The data processing sub-system can use a pattern matching license plate algorithm to extract the license plate number from the image. The data processing sub-system can also use a full recognition mode license plate recognition algorithm to extract the license plate number from the image. It is also contemplated that the data processing sub-system can use both a pattern matching license plate algorithm and a full recognition mode license plate recognition algorithm to extract the license plate number from the image.

The data processing sub-system can use known "Optical Character Recognition" (or OCR) techniques to extract the license plate number from the image. OCR image analysis is a well-established technology that has many applications in the publishing and archiving industry. Essentially, OCR is an image analysis process that converts a raster-scanned image of printed characters into machine readable ASCII codes, thereby eliminating the need to re-type old documents into a computer and rendering them amenable to automated processing.

One common application of OCR technology is to digitize a vehicle's license plate number from its raster image. When applied to vehicular imagery, OCR technology is commonly referred to as "License Plate Recognition" (LPR). LPR has been applied to stationary law enforcement and security applications (e.g. identifying vehicles in controlled areas such as parking garages). LPR technology has also been successfully applied in revenue collection applications (e.g. automatic billing of motorists using toll highways).

LPR is typically comprised of three operations that are sequentially applied to the vehicle's raster image. These processes attempt to progressively refine the complex, unique identification of the vehicle captured in the raster image into an alphanumeric string of text identical to the text inscribed on the vehicle's license plate. Since this alphanumeric string of test is compact, easily comprehended and legally linked to the vehicle's owner, its correct extraction from the raster image is the ultimate goal of LPR.

The three steps that comprise LPR generally include vectorizing the raster image, recognizing the license plate within the vector-model and recognizing the alphanumeric characters in the plate-model. Vectorizing the raster image involves recognizing that discrete physical objects depicted in a raster image will generate zones within which all the pixels share similar color or gray-scale values. Vectors are mathematically defined lines that trace the perimeter of these zones. Some LPR algorithms make use of the aggregation of pixels inside these zones rather than their perimeter however for the purpose of this summary, they can be considered the same geometric entities. Before tracing the outline of these zones, spatial filtering algorithms are applied to the raster image to compensate for the effects of extraneous pixel noise (such as varying color caused by precipitation, dirt on the vehicle, slight variations in paint color, etc). The object of vectorization is to identify and group only those pixels that correspond to real physical objects portrayed as discrete visual features in the raster image. In the case of a parked car's raster image, the desired vectors follow the silhouettes of the various mechanical parts and visual features that comprise the car (windows, fenders, bumpers, license plate, license plate text, dirt on license plate, etc). The vectorization algorithm may also outline discrete elements in the visible background scenery (sidewalk, trees, pedestrians etc.). The set of all vectors extracted from a raster image using a particular algorithm constitutes a unique "digital fingerprint" for the scene in the image. This unique identifier is hereafter referred to as the image's "vector-model".

The license plate within the vector-model is recognized by applying algorithms to the image's vector-model to isolate only those vectors or zones of similar pixels that describe the license plate's physical structure. This unique "digital fingerprint" of the license plate is hereafter referred to as the "plate-model." Different algorithms could be applied to the vector-model to try to isolate other physical structures (the "bumper-model" the "window-model" etc). However, for typical applications, the license plate is the physical object of greatest interest, therefore the plate-model is the subset searched for within the image.

The rectangular shape of a license plate provides one criterion for testing if a candidate subset set of vectors is indeed the plate-model. However, there will typically be many vectorized rectangles in the vector-model that complicate isolating the plate-model (dealer logos, bumper stickers, parking permits, decorative trim etc.). Therefore, multiple geometric and stochastic tests are typically made on all candidate plate-models in order to rank their probability of being the correct one. When one of the candidate plate-models achieves a sufficiently high probability of modeling the real license plate, it is analyzed to recognize the alphanumeric characters (discussed below).

Some LPR implementations only vectorize a subset of the total raster image and create the plate-model directly. Various methods can be used to directly localize the plate. One approach is to exploit the reflective paint used on many license plates. The plate's reflective surface can be used to localize it within the image without the need to vectorize other physical elements in the scene.

In order to recognize the alphanumeric characters in the plate-model, the plate-model is analyzed to transform the vectorized zones within its perimeter into an alphanumeric string of characters that spell out the vehicle's license plate number. The recognized string of text that estimates the vehicle's license plate number is hereafter referred to as the "plate-string". Typically, before attempting to recognize the plate-string's characters, the distortion caused by an oblique camera angle is geometrically rectified. This geometric rectification procedure is generally referred to as "de-skewing." Since character recognition is based on analysis of the plate-model's geometry, de-skewing the perspective distortion of the vectorized zones will improve the accuracy of the character recognition algorithm.

Typically, one of three OCR methodologies is used to recognize each character of the plate-string from within the plate-model. "Structural analysis", "pattern matching", and "neural networks" are the terms commonly used for these algorithms. Each of these complex algorithms is well documented in the literature and has its unique advantages and disadvantages. Some LPR systems use combinations thereof to improve the reliability of the characters recognized from the plate-model. To improve the reliability of character recognition, the LPR algorithm must also be customized to accommodate the different fonts, color schemes and character syntax's appearing on the plates issued in different transportation jurisdictions.

The sequential 3-step algorithm described above is commonly known as "Full Recognition Mode LPR." Full Recognition Mode LPR algorithms cannot recognize the plate-strings of all observed vehicles with 100 percent accuracy. However, for some applications a certain number of plate-string errors is acceptable. For example, it is acceptable that a certain percentage of vehicles passing through a toll plaza not be correctly recognized (and thereby escape being billed the toll charge). Unrecognizable plates can be tolerated if the algorithm is at least able to compute that its best estimate of the plate-string is not sufficiently reliable, thereby permitting the enforcement system to simply ignore those "difficult" plate readings. Accordingly, in the present system the license plate number will preferably be displayed for the mass transit vehicle operator (or driver), who will be given the opportunity to make corrections to the license plate number before recording the violation data record.

Preferably, the data processing sub-system is also capable of determining the issuing state of the license plate of the violating vehicle from the image, so that the violating vehicle information includes both the license plate number and the state from which it was issued. The state can be determined using the techniques described above to recognize the state logo appearing on the license plate. The image of the logo can be compared to know logos stored in a database.

The parking violation recording system can also include an operator interface for an operator to selectively create the violation data record. The interface can be selected from the group consisting of a manual switch, a computer interface and a voice controlled switch. The parking violation recording system can also include a display for displaying an image containing violating vehicle information of the violating vehicle to assist the operator in determining whether or not to selectively create the violation data record. This allows the operator to make corrections or begin the data collection process again.

In one embodiment, it is contemplated that the parking violation recording system includes a sensor located on the mass transit vehicle and coupled to the data processing sub-system, wherein the sensor measures the distance between a potentially violating vehicle and the sensor. In such an embodiment, the data processing sub-system is preferably capable of determining if the potentially violating vehicle is a violating vehicle and automatically creating a violation data record, in the event the vehicle is a violating vehicle.

Preferably, the parking violation recording system also includes a database coupled to the data processing sub-system for storing a plurality of violation data records. The parking violation recording system also preferably includes a download interface for downloading the plurality of violation data records to a citation database contained in a remote data processing system, the remote data processing system being remote from the mass transit vehicle, for further processing by law enforcement to generate a citation for the parking violation.

The download interface can operate through a hardwire connection between the data processing sub-system and the remote data processing system. The download interface can also operate through wireless communication between the data processing sub-system and the remote data processing system.

Figure 1B:
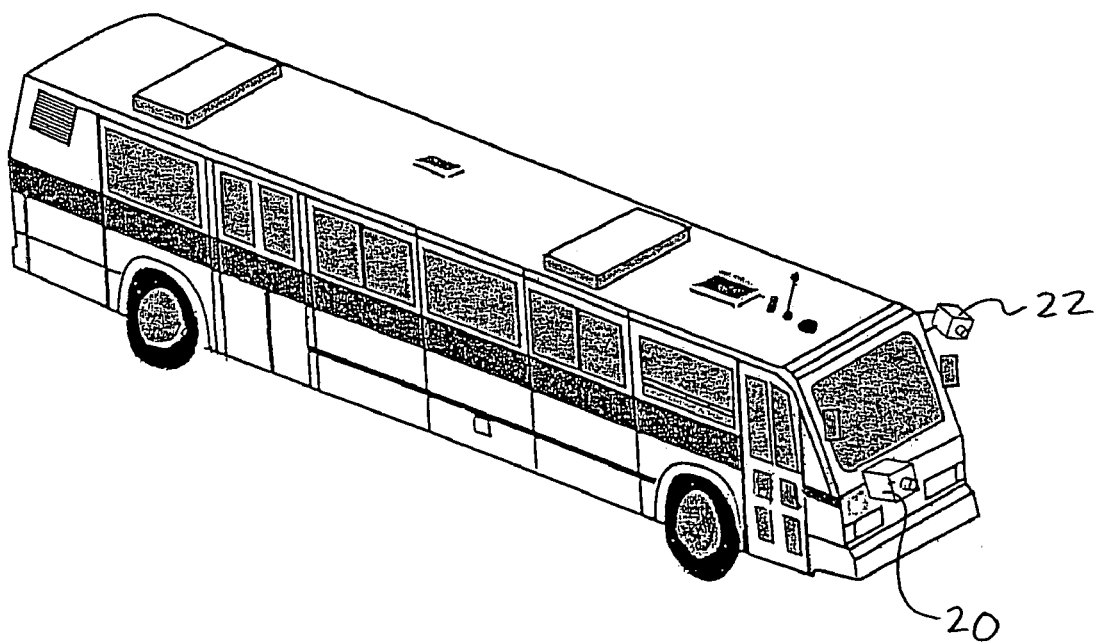
FIG. 1B is a prospective view of a mass transit bus equipped with a parking violation recording system, according to another preferred embodiment of the present invention.

In one preferred embodiment, the invention is directed to a bus zone violation recording system capable of recording violations of a violating vehicle located in a bus zone. Referring to FIGS. 1A and 1B, aspects of bus zone violation recording systems in accordance with the invention are depicted. In FIG. 1A, the system includes a camera 10 located on a mass transit bus 12, oriented so that it is capable of viewing a violating vehicle located in a bus zone. The system also includes a locator consisting of a GPS having a GPS antenna 14 on the roof of the bus 12 and relative position devices (not shown). The relative position devices include odometer inputs providing distance traveled and a gyroscope that observes changes in direction. The relative position data can be used to correct errors in the GPS data due to degradation, blockages or communication dropouts. The system also includes a data processing sub-system, coupled to the camera 10 and locator. The data processing sub-system can record violating vehicle information and geographic data in a violation data record. The violation data record can be transmitted to a data processing system remote from the mass transit bus 12, in real time via a wireless local area network antenna 16 and/or a wireless wide area network antenna 18.

Referring to FIG. 1B, the system includes a first camera 20 positioned to capture license plate information from a violating vehicle and a second camera 22 positioned to capture a larger image of the violating vehicle. The second camera 22 preferable captures a color image of the vehicle.

Figure 2:
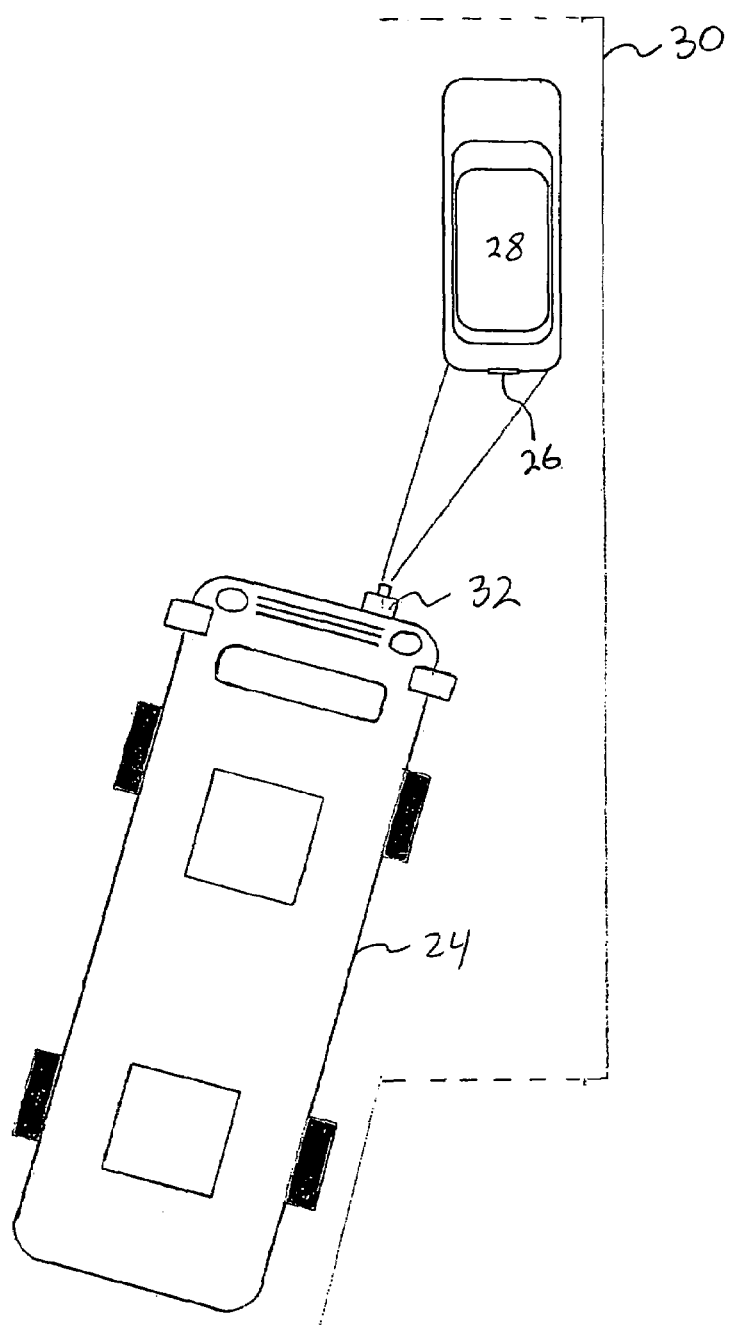
FIG. 2 is a top view of a mass transit bus recording a violating vehicle parked in a bus zone, according to a preferred embodiment of the present invention.

FIG. 2 depicts a top view of a mass transit bus 24 equipped with a parking violation recording system according to the invention. The bus 24 is recording license plate information from the license plate 26 of a violating vehicle 28 parked in a bus zone 30 via a camera 32 mounted on the front of the bus 24.

Figure 3:
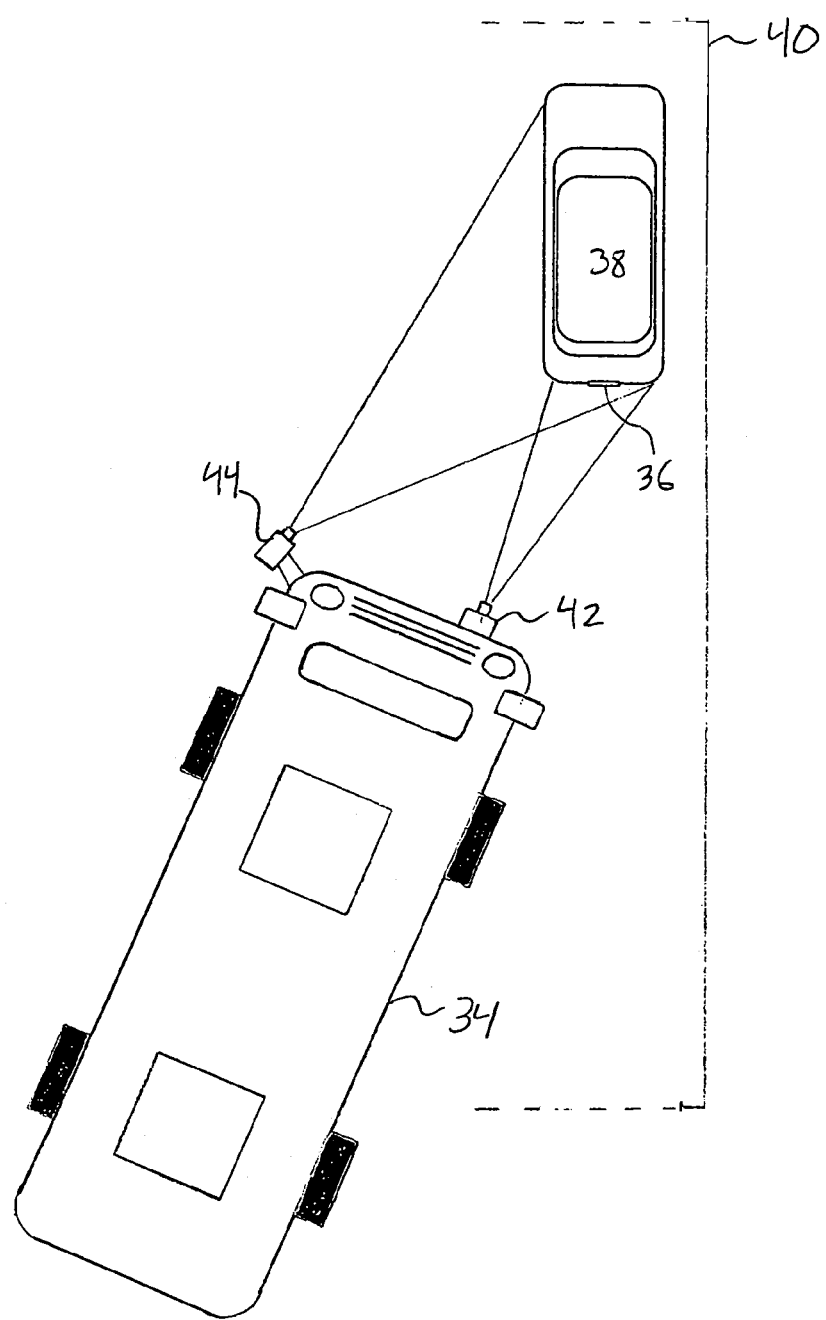
FIG. 3 is a top view of a mass transit bus recording a violating vehicle parked in a bus zone, according to another preferred embodiment of the present invention.

FIG. 3 depicts a top view of a mass transit bus 34 equipped with another embodiment of a parking violation recording system according to the invention. The bus 34 is recording license plate information from the license plate 36 of a violating vehicle 38 parked in a bus zone 40 via a camera 42 mounted on the right front of the bus 34 and recording an image of the violating vehicle 38 via a camera 44 mounted on the left front of the bus 34.

Figure 4:
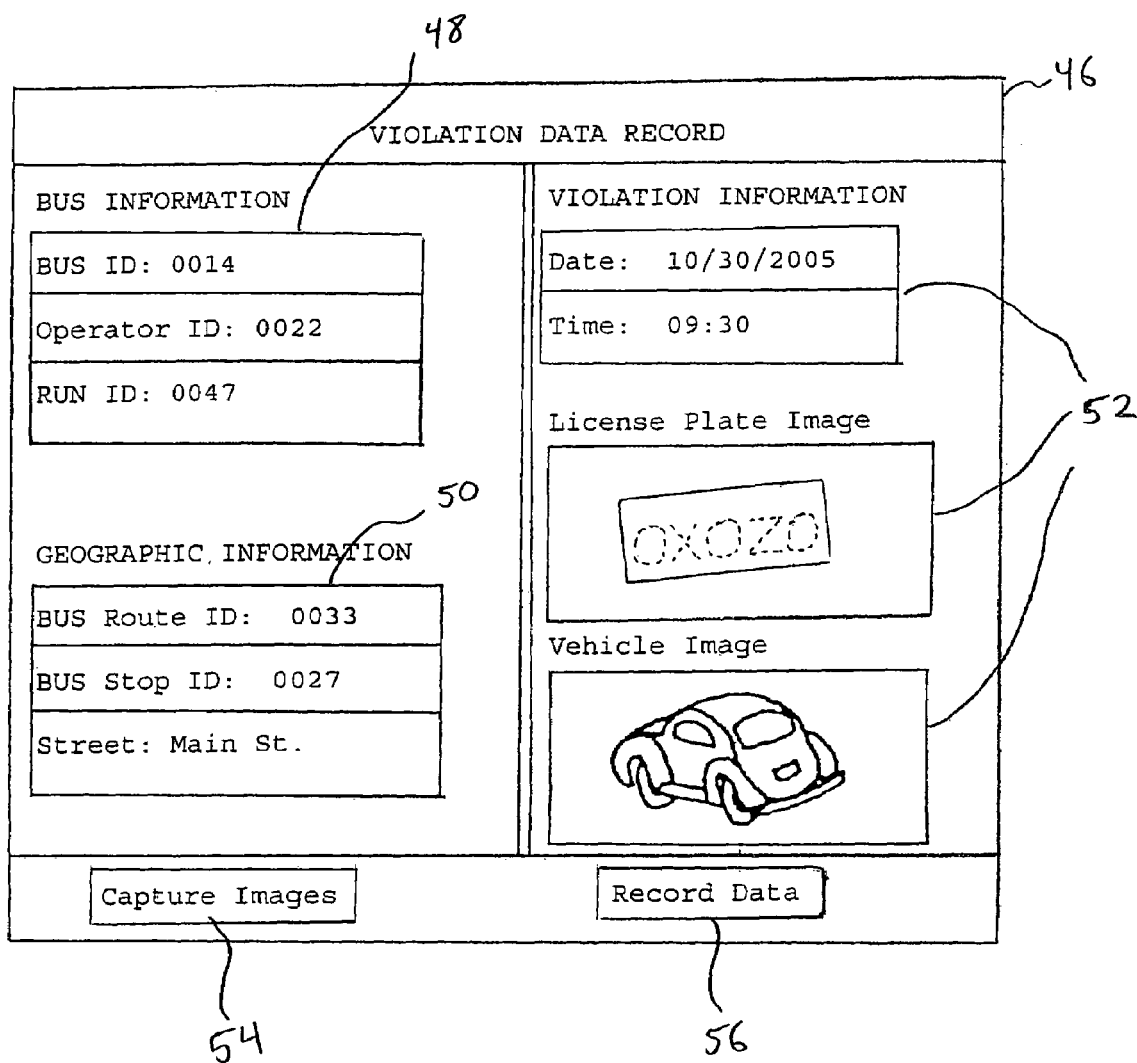
FIG. 4 shows an illustrative operator interface display for displaying violation data for the operator to determine if a violation data record should be created.

FIG. 4 shows an operator interface display 46 for use by a bus operator to view the violation data and selectively create a violation data record if the information is correct. The display 46 includes bus information data fields 48, geographic information data fields 50 and violation information data fields 52. The bus information data fields include bus ID, operator ID and run ID. The geographic information data fields include bus route ID, bus stop ID and street name where the bus stop and bus zone are located. The violation information fields include the date, time, license plate image and vehicle image. Upon observing a violating vehicle parked in a bus zone, the bus operator can adjust the cameras to capture images of the license plate and side view of the violating vehicle. The operator can then select the Capture Images selector box 54 to capture the data on the screen. If the data is accurate and legible, the operator can then select the Record Data selector box 56 to create and record a violation data record. If the data is not accurate and legible, the operator can repeat the process by selecting the Capture Images selector box 54 again.

It is also contemplated that the operator interface display will include a means for manually editing the data fields, e.g., via a keyboard. It is also contemplated that the violation data record, which is recorded for use in creating a citation or parking/traffic ticket for the violation, can include additional data (to the data shown on the operator interface screen). For example, the additional data can include precise position data for the bus or the violating vehicle, such as coordinates or a specific map location.

Thus, while there has been disclosed what is presently believed to be the preferred embodiments of the invention, those skilled in the art will appreciate that other and further changes and modifications can be made without departing from the scope or spirit of the invention, and it is intended that all such other changes and modifications are included in an are within the scope of the invention as described in the appended claims.

What is claimed is:

1. A parking violation recording system capable of recording violations based on the location of a violating vehicle, said system comprising:
   at least one camera located on a mass transit vehicle, oriented so that it is capable of viewing a violating vehicle and recording an image containing violating vehicle information of said violating vehicle;
   at least one locator provided on said mass transit vehicle and capable of providing data for determining the geographic position of said mass transit vehicle; and
   a data processing sub-system, coupled to said at least on camera and said at least one locator for recording both said violating vehicle information and said geographic position data in a violation data record, wherein said data processing sub-system further comprises a memory containing stored map data and mass transit vehicle data, and wherein said data processing sub-system compares said geographic position data to said stored map data and makes corrections to said geographic position data based on said comparison.

2. A parking violation recording system according to claim 1, wherein said mass transit vehicle is a bus.

3. A parking violation recording system according to claim 2, wherein said violating vehicle is a vehicle illegally located in a bus zone.

4. A parking violation recording system according to claim 3, wherein said image is a digital image.

5. A parking violation recording system according to claim 4, wherein said violating vehicle information is a digital image of the violating vehicle's license plate.

6. A parking violation recording system according to claim 1, wherein said at least one locator is selected from the group consisting of a GPS capable of providing global position data, at least one navigation aid capable of providing relative position data of said mass transit vehicle and combinations thereof.

7. A parking violation recording system according to claim 6, wherein said relative position data includes at least one of distance measurements, heading measurements and tilt measurements.

8. A parking violation recording system according to claim 7, wherein said navigation aid includes at least one of anti-lock braking system wheel turns data, electronic compass heading and pitch, and map vertical height.

9. A parking violation recording system according to claim 6, wherein said at least one locator comprises a GPS and at least one navigation aid which provides relative position data selected from the group consisting of distance measurements, heading measurements, tilt measurements and combinations thereof.

10. A parking violation recording system according to claim 9, wherein said data processing sub-system is capable of integrating the GPS position data and the relative position data and determining a smoothed position data for said mass transit vehicle.

11. A parking violation recording system according to claim 10, wherein said data processing sub-system is capable of compensating for degradation, blockages or communication dropouts of the GPS position data from satellites in determining the smoothed position data.

12. A parking violation recording system according to claim 11, wherein said data processing sub-system is capable of determining smoothed position data that is accurate to within at least about 70 feet.

13. A parking violation recording system according to claim 12, wherein said smoothed position data is accurate to within at least about 50 feet.

14. A parking violation recording system according to claim 13, wherein said smoothed position data is accurate to within at least about 30 feet.

15. A parking violation recording system according to claim 1, wherein said stored map data includes data selected from the group consisting of a predetermined route, transit stop inventory, a route identifier associated with a predetermined route, a transit stop identifier associated with a particular transit stop along a route and combinations thereof.

16. A parking violation recording system according to claim 1, wherein said mass transit vehicle data includes data selected from the group consisting of a vehicle identifier, an operator identifier, a run identifier and combinations thereof.

17. A parking violation recording system according to claim 16, further comprising a date and time clock, wherein said data processing sub-system is coupled to said clock for recording date and time information in said violation data record.

18. A parking violation recording system according to claim 17, wherein said data processing sub-system is capable of determining said route identifier and said transit stop identifier from said geographic data and said map data and recording said identifiers in said violation data record.

19. A parking violation recording system according to claim 1, wherein said data processing sub-system is capable of extracting said license plate number from said image and said violating vehicle information is the license plate number of said violating vehicle.

20. A parking violation recording system according to claim 19, wherein said data processing sub-system uses a pattern matching license plate algorithm to extract the license plate number from the image.

21. A parking violation recording system according to claim 19, wherein said data processing sub-system uses a full recognition mode license plate recognition algorithm to extract the license plate number from the image.

22. A parking violation recording system according to claim 19, wherein said data processing sub-system uses a pattern matching license plate algorithm and a full recognition mode license plate recognition algorithm to extract the license plate number from the image.

23. A parking violation recording system according to claim 19, wherein said data processing sub-system is capable of determining the issuing state of the license plate of the violating vehicle from said image and said violating vehicle information includes both the license plate number and the state from which it was issued.

24. A parking violation recording system according to claim 1, further comprising an operator interface for an operator to selectively create said violation data record.

25. A parking violation recording system according to claim 24, wherein said interface is selected from the group consisting of a manual switch, a computer interface and a voice controlled switch.

26. A parking violation recording system according to claim 24, wherein said interface comprises a display for displaying an image containing violating vehicle information of said violating vehicle to assist the operator in determining whether or not to selectively create said violation data record.

27. A parking violation recording system according to claim 1, further comprising a sensor located on said mass transit vehicle and coupled to said data processing sub-system, said sensor measuring the distance between a potentially violating vehicle and said sensor.

28. A parking violation recording system according to claim 27, wherein said data processing sub-system is capable of determining if said potentially violating vehicle is a violating vehicle and automatically creating a violation data record, in the event the vehicle is a violating vehicle.

29. A parking violation recording system according to claim 1, further comprising a database coupled to said data processing sub-system for storing a plurality of violation data records.

30. A parking violation recording system according to claim 29, further comprising a download interface for downloading said plurality of violation data records to a citation database contained in a remote data processing system, said remote data processing system being remote from said mass transit vehicle, for further processing by law enforcement to generate a citation for the parking violation.

31. A parking violation recording system according to claim 30, wherein said download interface operates through a hardwire connection between said data processing sub-system and said remote data processing system.

32. A parking violation recording system according to claim 30, wherein said download interface operates through wireless communication between said data processing sub-system and said remote data processing system.

33. A bus zone violation recording system capable of recording violations of a violating vehicle located in a bus zone, said system comprising:
    at least one camera located on a mass transit bus, oriented so that it is capable of viewing a violating vehicle located in a bus zone and recording an image containing violating vehicle information of said violating vehicle;
    at least one locator provided on said bus and capable of providing data for determining the geographic position of said bus, said at least one locator selected from the group consisting of a GPS capable of providing global position data, at least one navigation aid capable of providing relative position data of said bus and combinations thereof;
    a date and time clock; and
    a data processing sub-system, coupled to said at least one camera, said at least one locator and said clock for recording said violating vehicle information, said geographic position data and date and time information in a violation data record;
    wherein said data processing sub-system comprises a memory containing stored map data, said map data comprising an inventory of location identifiers including an identifier selected from the group consisting of a route identifier associated with a predetermined route, a bus stop identifier associated with particular bus stop along a route, a bus zone identifier associated with a particular bus zone at a bus stop and combinations thereof; and wherein said data processing sub-system is capable of determining location identifiers associated with the present location of said bus, from said geographic data and said map data, recording said identifiers in said violation data record and making corrections to said geographic position data based on said determination of location identifiers associated with the present location of said bus.

34. A bus zone violation recording system according to claim 33, further comprising an operator interface for an operator to selectively create said violation data record.

35. A bus zone violation recording system according to claim 34, wherein said violation data record includes a digital image containing violating vehicle information of said violating vehicle, geographic information identifying the location of said violating vehicle, and date and time information.

36. A bus zone violation recording system according to claim 34, wherein said violation data record includes a license plate number of said violating vehicle, geographic information identifying the location of said violating vehicle, and date and time information.

37. A bus zone violation recording system according to claim 33, further comprising a first camera located on said mass transit bus, oriented so that it is capable of recording the license plate number of said violating vehicle, and a second camera located on said mass transit bus, oriented so that it is capable of recording an image of said violating vehicle; and wherein said data processing sub-system is coupled to said first and second cameras for recording said license plate number and said image of said violating vehicle in said violation data record.

* * * * *